Figures 1, 2:
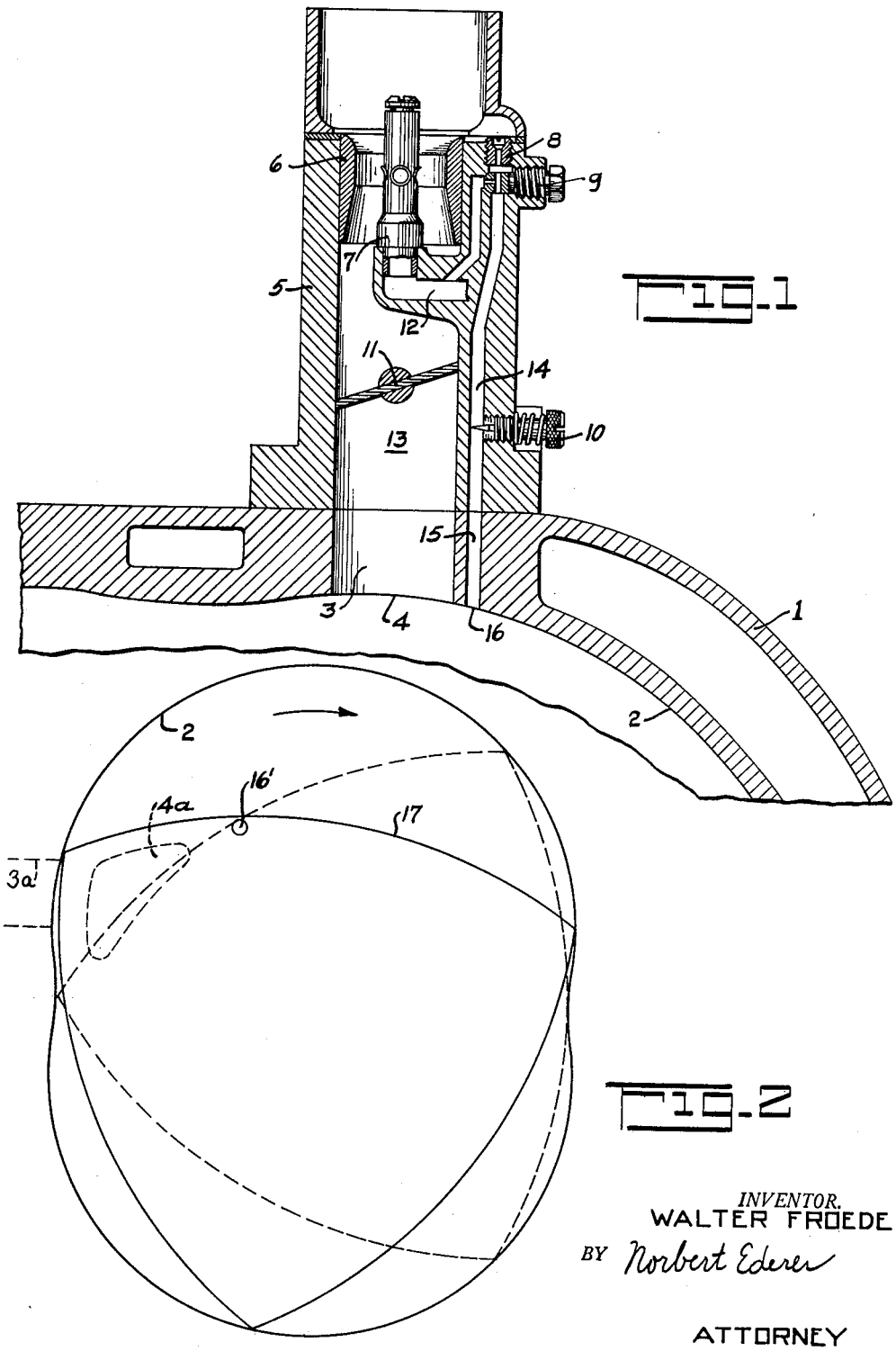

Feb. 2, 1965  W. FROEDE  3,168,077
ROTARY COMBUSTION ENGINE
Filed Jan. 18, 1962  3 Sheets-Sheet 1

INVENTOR.
WALTER FROEDE
BY Norbert Ederer
ATTORNEY

INVENTOR.
WALTER FROEDE
BY Raymond P. Wallace
AGENT

United States Patent Office 3,168,077
Patented Feb. 2, 1965

3,168,077
ROTARY COMBUSTION ENGINE
Walter Froede, Neckarsulm, Wurttemberg, Germany, assignor to NSU Motorenwerke Aktiengesellschaft, Neckarsulm, Germany, and Wankel G.m.b.H., Lindau (Bodensee), Germany
Filed Jan. 18, 1962, Ser. No. 167,011
Claims priority, application Germany, Feb. 1, 1961, N 19,522
5 Claims. (Cl. 123—8)

This invention relates to rotary combustion engines, and is particularly useful in connection with rotary combustion engines similar to that disclosed in U.S. Patent No. 2,988,065.

Such a rotary combustion engine comprises an outer body having a cavity therein and an inner body relatively rotatable within said cavity, about an axis laterally spaced from but parallel to the axis of said cavity. The outer body has axially-spaced end walls and a peripheral wall interconnecting the end walls to form said cavity, the inner surface of the cavity peripheral wall having a multi-lobe profile which preferably is basically an epitrochoid. The inner body has end faces disposed adjacent to said outer body end walls for sealing cooperation therewith and has a peripheral surface with a plurality of circumferentially-spaced apex portions, each carrying a radially-movable seal for sealing engagement with the multi-lobe inner surface of the outer body peripheral wall to form a plurality of working chambers between the two bodies which vary in volume upon relative rotation of the two bodies. Each such apex seal of the inner body runs axially from one end face to the other of the inner body. The number of apices will usually exceed the number of lobes of the epitrochoid by one.

In the subsequent discussion it will be assumed that the inner body is rotary whereas the outer body is stationary.

Accordingly, the inner body will be identified as the rotor and the outer body as housing. It will be appreciated, however, that the considerations applicable to the prior art as well as to the described invention apply equally in the situations where the relations of inner and outer body are inverted, or where both inner and outer body may be rotating as described in the mentioned Patent 2,988,065.

Rotary combustion engines of the character so far described further include a carburetor which feeds fuel-air mixture into the cavity within the engine housing through a suitable channel that terminates in an intake port in the housing wall. In a given rotor cycle, the rotor will cover and uncover the intake port and also a corresponding exhaust port so as to admit fresh charge and exhaust combusted gases at the proper time in the cycle. The intake port may be provided with a relatively large cross-section, and this is one of the advantages peculiar to rotary combustion engines presently contemplated. This results in a very good rate of fuel flow and corresponding high performance. However, there are certain disadvantages that are due to the relatively large intake port cross-section. For one, engine starting operation is rendered difficult. For another, when idling such engines tend to run roughly and noisily because the small amount of charge required for idling is condensed in the intake channel, and part of the fuel deposits on the wall of the intake channel. As a result, a nonhomogeneous and a nonuniformly composed mixture remains for idling operation.

It is accordingly a general object of the invention to eliminate the above-mentioned disadvantages.

More specifically, it is an object of the invention to provide a rotary combustion engine having an intake port with relatively large cross-section to retain the advantages thereof, while eliminating the undesirable effects of starting difficulties, rough and noisy idling, and fuel deposition.

A still further object of the invention is to assure that when the idling fuel-air mixture is required, it shall be substantially fully burned, and when it is not required, its entry into the engine working chamber shall be substantially blocked. The invention contemplates provision of a separate intake channel for the idling mixture, which terminates in a separate idling mixture intake port. Such separate intake port is traversed, i.e. covered and uncovered, by the rotor in the course of an engine cycle, as is the case for the main inlet and exhaust ports. In this manner, the condensation of the idling mixture and deposition of fuel on the channel wall is substantially eliminated, so that it is possible to obtain easy starting at low engine speeds and low engine temperatures, and smooth idling of the engine. The idling mixture intake port may be located in the peripheral wall or in one end wall of the housing.

The cross-section of the idling mixture intake port is preferably made of such a size and is placed at such a location that mixture is drawn in only at low engine speeds. This is of importance in obtaining lower fuel consumption when the engine is operating at higher speed. For example, under conditions of engine coasting at high speed, as occcurs when rolling downhill in an automobile with closed throttle, the idling mixture intake port will be open very briefly so that no mixture enters the working chambers. To this end, the intake opening is located in one end plate of the housing, and at a location that is uncovered only briefly by the rotor.

Figure 3:
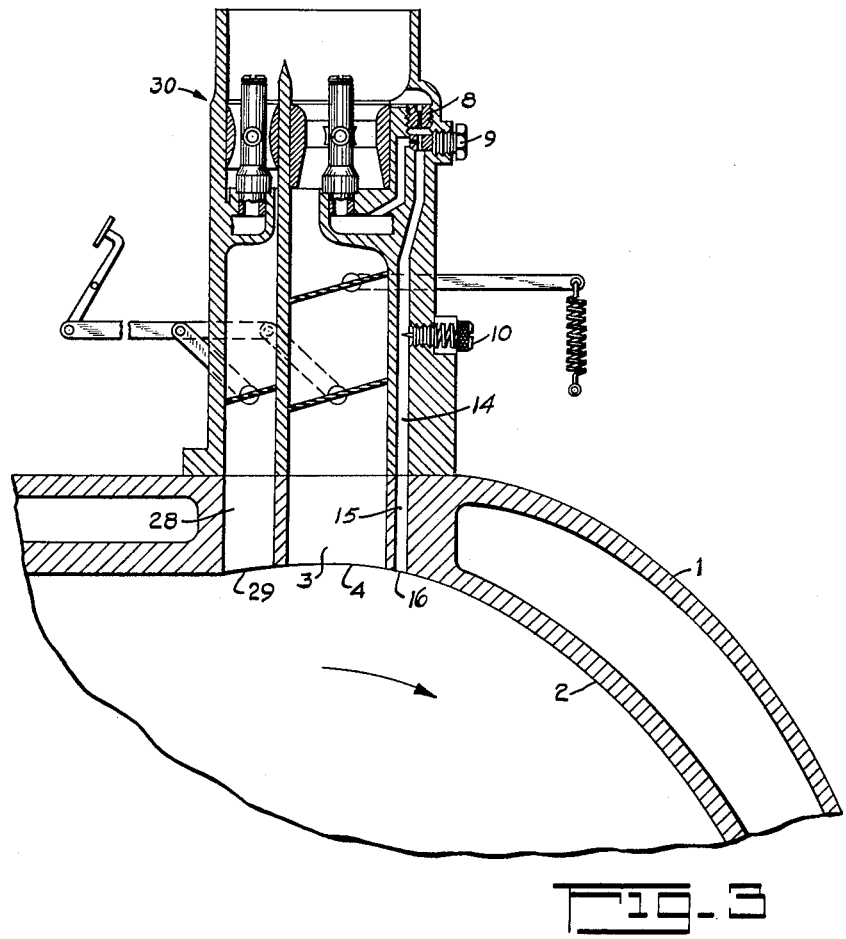
Figure 4:
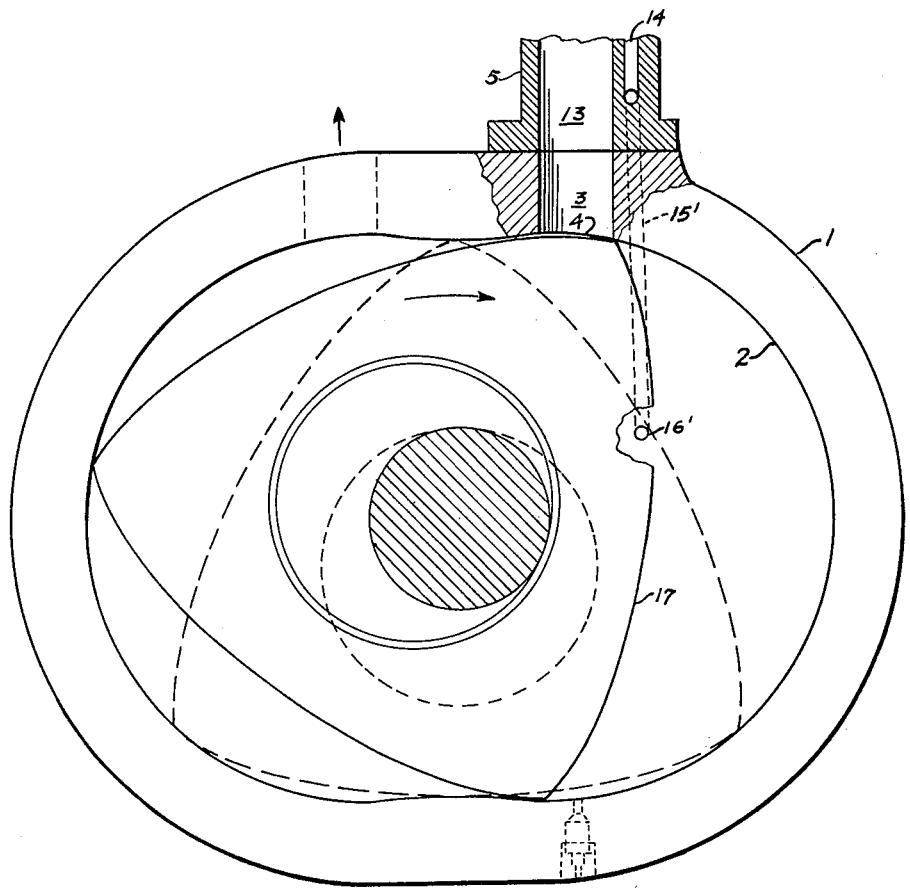

For a better understanding of the invention, reference is made to the following more detailed specification, of which the appended claims form a part, when considered together with the accompanying drawing in which:

FIG. 1 is an elevational view in cross-section through the peripheral surface of a rotary combustion engine incorporating the concepts of the present invention, and FIG. 2 is a diagrammatic end view of rotor and housing of a rotary combustion engine, embodying a modification of the invention, and FIG. 3 is an elevational view similar to FIG. 1, embodying a further modification of the invention, and FIG. 4 is an elevation partly in cross-section showing a further modification of the invention.

Referring first to FIG. 1, reference numeral 1 designates the peripheral surface or shell or housing of a rotary combustion engine, whose inner contour is in the form of a two-lobed epitrochoid. In the housing 1 is disposed an intake channel 3, that terminates in a main fuel-air mixture intake port 4 and that is connected to a carburetor 5. The carburetor is provided in usual manner with an air funnel 6, a jet 7, an idling air nozzle 8, an idling jet 9, and an idling mixture-regulating screw 10, as well as with a throttle flap 11. Fuel is introduced at a suitable conduit 12 and arrives at the one hand at the jet 7 and on the other hand at the idling jet 9. The mixture for normal operation of the engine is drawn through channel 13 by suction, its amount being regulated by the setting of throttle 11. The idling mixture is drawn in through the channel 14 and is regulated by the screw 10. In accordance with the invention, the intake port 16 and its associated intake channel 15 are physically separate from, and have cross-sections that are relatively small compared to those of main intake port 4 and its associated intake channel 13. Channel 15 passes through housing shell 1, and its terminating port 16 is situated in the inner surface 2 of the shell 1. The idling mixture port 16 is, like the main intake port, traversed by the apices of the rotor (not shown), that is, covered and uncovered as the rotor performs an operating cycle. By reason of passage of the idling mixture into its own and separate channel of small cross-section, condensation is avoided, and a constantly homogeneous mixture of uniform composition is obtained.

In the embodiment of FIG. 1, the idling mixture intake port and channel are disposed in the peripheral wall of the housing. In the arrangement according to FIG. 2, they are advantageously located in an end wall. More particularly, element 3a is the main mixture intake channel, which terminates in main intake port 4a. The idling mixture intake port is designated by 16'; both intake ports are located in an end wall of the housing and are covered by rotor 17 in its indicated solid line position. The indicated location of opening 16', that is displaced from the major and minor axes of the epitrochoid, is advantageous, as rotor 17 will uncover port 16' only briefly during a given cycle. This brief opening suffices, at low speeds, to admit a sufficient amount of charge to run the engine. If however the engine runs at high speed, under coasting conditions for example, the time interval of uncovering of port 16 is to brief to admit any amount of substantial charge; this is in view of the small cross-section of opening 16'. In this manner fuel consumption is minimized under coasting conditions, as the throttle in the main intake channel will be closed. In the dotted-line position of rotor 17, the auxiliary idling mixture intake port 16' is just about to be opened by the rotor; whereas in the solid line position, the rotor has just closed port 16'. The traverse of the rotor between the dotted-line and the solid-line positions corresponds to about 110° of crank shaft angle. By way of contrast, the main intake port 4a is uncovered for a crank shaft angle of from 300° to 340°. It will be appreciated that the given crank shaft angles are merely illustrative; they are presented for purpose of comparison of the time intervals of opening of the main and auxiliary intake ports. The figures will vary, depending upon the particular construction of a given engine. It should further be noted that in the arrangement according to FIG. 2, the main intake port 4 may also be located in the peripheral shell of the housing as shown in FIG. 4.

In FIG. 3, basically the same arrangement as in FIG. 1 is shown with the only difference that a separate partial load intake channel 28 is provided which terminates in a separate partial load intake port 29. By reason of passage of the mixture for partial load into its own channel the cross-section of which being chosen such that condensation of the partial load mixture the amount of which being small as compared to the amount at full load, is prevented the same advantageous results are obtained as has been described with respect to the idling mixture. The carburetor generally designated 30 is of the well known multiple nozzle type and does not form part of the present invention.

While two embodiments of the invention have been specifically described, it should be understood that this invention is not limited to specific details of construction and arrangement thereof herein illustrated, and that changes and modifications may occur to one skilled in the art without departing from the spirit of the invention.

What is claimed is:
1. In a rotary combustion engine of the kind comprising an outer body having a cavity therein and an inner body relatively rotatable within said cavity about an axis laterally spaced from but parallel to the axis of said cavity, said outer body having axially-spaced end walls and a peripheral wall interconnecting the end walls to form said cavity, the inner surface of the cavity peripheral wall having a multi-lobe profile which is basically an epitrochoid, said inner body having end faces disposed adjacent to said outer body end walls for sealing cooperation therewith and having a peripheral surface with a plurality of circumferentially-spaced apex portions, an apex seal member carried by each apex portion and engaging the multi-lobe inner surface of the outer body peripheral wall and also its axially-spaced end walls in sealing relation to form a plurality of working chambers between the two bodies which vary in volume on relative rotation of the two bodies, a carburetor feeding fuel-air mixture into said cavity via a main channel which extends through said outer body and terminates at said cavity in a main intake port, said channel having a relatively large cross-section, and a throttle disposed within said channel, the improvement comprising physically separate idling mixture intake channel means extending through said outer body and terminating in at least one idling mixture intake port at said cavity to provide separate communication between said carburetor and said cavity, the latter channel means having substantially smaller cross-section than the former and providing communication of said small cross-section between said cavity and said carburetor when said throttle is closed, whereby idling fuel consumption is substantially diminished.

2. The invention according to claim 1, wherein the idling mixture intake channel passes through the outer body and terminates in an intake port located in an interior peripheral wall of said outer body.

3. The invention according to claim 1, wherein the idling mixture intake channel passes through the outer body and terminates in an intake port located in an interior end wall of said outer body.

4. The invention according to claim 3 wherein the idling mixture intake port is displaced from both the major and minor axes of the epitrochoid, so as to be uncovered during a given engine cycle for a substantially smaller time interval than the intake port in which the aforesaid main channel terminates.

5. The invention according to claim 1 and comprising a physically separate partial load mixture intake channel extending through one of said bodies and providing separate communication between said carburetor and cavity.

References Cited in the file of this patent
UNITED STATES PATENTS
2,988,065    Wankel et al. _____ June 13, 1961

FOREIGN PATENTS
681,038    Great Britain _____ Oct. 15, 1952